US012168352B2

(12) United States Patent
Nagai et al.

(10) Patent No.: US 12,168,352 B2
(45) Date of Patent: Dec. 17, 2024

(54) LIQUID STORAGE CONTAINER

(71) Applicant: CANON KABUSHIKI KAISHA, Tokyo (JP)

(72) Inventors: Noriyasu Nagai, Tokyo (JP); Ryoji Inoue, Kanagawa (JP); Kyosuke Nagaoka, Tokyo (JP); Takayuki Tanno, Tokyo (JP); Kenta Udagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/325,926

(22) Filed: May 30, 2023

(65) Prior Publication Data

US 2023/0302804 A1 Sep. 28, 2023

Related U.S. Application Data

(63) Continuation of application No. 17/370,942, filed on Jul. 8, 2021, now Pat. No. 11,701,890.

(30) Foreign Application Priority Data

Jul. 16, 2020 (JP) ................................ 2020-122250

(51) Int. Cl.
*B41J 2/175* (2006.01)
*B65D 47/12* (2006.01)
*B65D 49/08* (2006.01)

(52) U.S. Cl.
CPC ....... *B41J 2/17509* (2013.01); *B41J 2/17513* (2013.01); *B41J 2/17523* (2013.01);
(Continued)

(58) Field of Classification Search
CPC ................ B41J 2/17509; B41J 2/17513; B41J 2/17523; B41J 2/1754; B41J 2/17596;
(Continued)

(56) References Cited

U.S. PATENT DOCUMENTS 6,145,972 A 11/2000 Udagawa et al. .............. 347/86
6,164,768 A 12/2000 Murphy et al. ................. 347/85
(Continued)

FOREIGN PATENT DOCUMENTS

CN 102463745 5/2012
CN 107487084 12/2017
(Continued)

OTHER PUBLICATIONS

Extended European Search Report dated Dec. 17, 2021 in counterpart EP Application No. 21185113.4.
(Continued)

*Primary Examiner* — Jason S Uhlenhake
*Assistant Examiner* — Alexander D Shenderov
(74) *Attorney, Agent, or Firm* — Venable LLP

(57) ABSTRACT

A liquid storage container includes: a discharge port member including a discharge port through which liquid stored in a storage portion is discharged; a cover portion configured to be attachable to the discharge port member and to be capable of opening and closing the discharge port; and a sealing portion formed of a contact portion between the cover portion and the discharge port member. The cover portion includes a groove structure between an outer periphery of the cover portion and the sealing portion.

15 Claims, 8 Drawing Sheets

(52) U.S. Cl.
CPC ........... *B41J 2/1754* (2013.01); *B65D 47/123* (2013.01); *B65D 49/08* (2013.01)

(58) Field of Classification Search
CPC ................ B41J 2/17506; B41J 2/17503; B41J 2/17553; B65D 47/123; B65D 49/08
USPC ............................................................ 347/85
See application file for complete search history.

(56) References Cited

U.S. PATENT DOCUMENTS

| | | | | |
|---|---|---|---|---|
| 6,244,695 | B1 | 6/2001 | Udagawa | 347/86 |
| 6,382,786 | B2 | 5/2002 | Iwanaga et al. | 347/86 |
| 6,416,173 | B2 | 7/2002 | Kishida et al. | 347/86 |
| 6,419,349 | B1 | 7/2002 | Iwanaga et al. | 347/86 |
| 6,527,381 | B1 | 3/2003 | Udagawa et al. | 347/86 |
| 6,554,411 | B1 | 4/2003 | Hatasa et al. | 347/86 |
| 6,652,949 | B2 | 11/2003 | Iwanaga et al. | 428/65.9 |
| 6,742,881 | B2 | 6/2004 | Kotaki et al. | 347/86 |
| 7,290,861 | B2 | 11/2007 | Inoue et al. | 347/49 |
| 7,311,388 | B2 | 12/2007 | Ogura et al. | 347/87 |
| 7,434,921 | B2 | 10/2008 | Udagawa | 347/85 |
| 7,735,984 | B2 | 6/2010 | Lijima et al. | 347/86 |
| 7,784,927 | B2 | 8/2010 | Inoue et al. | 347/86 |
| 7,854,499 | B2 | 12/2010 | Udagawa | 347/86 |
| 7,950,790 | B2 | 5/2011 | Kubo et al. | 347/86 |
| 8,002,397 | B2 | 8/2011 | Udagawa et al. | 347/86 |
| 8,087,762 | B2 | 1/2012 | Takemura et al. | 347/85 |
| 8,205,974 | B2 | 6/2012 | Ogura et al. | 347/86 |
| 8,313,185 | B2 | 11/2012 | Hatasa et al. | 347/92 |
| 8,322,807 | B2 | 12/2012 | Seki et al. | 347/6 |
| 8,469,498 | B2 | 6/2013 | Ohashi et al. | 347/86 |
| 8,550,607 | B2 | 10/2013 | Inoue et al. | 347/86 |
| 9,333,758 | B2 | 5/2016 | Koshikawa et al. | B41J 2/1752 |
| 9,375,938 | B2 | 6/2016 | Kondo et al. | B41J 2/17513 |
| 9,597,884 | B2 | 3/2017 | Nanjo et al. | B41J 2/17526 |
| 9,738,081 | B2 | 8/2017 | Kimura et al. | B41J 2/175 |
| 9,821,562 | B2 | 11/2017 | Nanjo et al. | B41J 2/17523 |
| 9,840,082 | B2 | 12/2017 | Nanjo et al. | B41J 2/17513 |
| 9,908,338 | B2 | 3/2018 | Koshikawa et al. | B41J 2/17559 |
| 9,914,308 | B2 | 3/2018 | Yamada et al. | B41J 2/1404 |
| 9,975,340 | B2 | 5/2018 | Karita et al. | B41J 2/14024 |
| 9,981,464 | B2 | 5/2018 | Karita et al. | B41J 2/155 |
| 10,005,287 | B2 | 6/2018 | Yamada et al. | B41J 2/14072 |
| 10,029,474 | B2 | 7/2018 | Takada et al. | B01D 19/0073 |
| 10,118,396 | B2 | 11/2018 | Kimura et al. | B41J 29/377 |
| 10,195,868 | B2 | 2/2019 | Yamada et al. | B41J 2/175 |
| 10,207,511 | B2 | 2/2019 | Nanjo et al. | B41J 2/175 |
| 10,308,029 | B2 | 6/2019 | Kudo et al. | B41J 29/12 |
| 10,350,901 | B2 | 7/2019 | Mizutani et al. | B41J 2/175 |
| 10,471,711 | B2 | 11/2019 | Karita et al. | B41J 2/16585 |
| 10,538,093 | B2 | 1/2020 | Nagashima et al. | B41J 2/17536 |
| 10,618,293 | B2 | 4/2020 | Koshikawa et al. | G03G 15/0886 |
| 10,906,323 | B2 | 2/2021 | Nagaoka et al. | B41J 2/17553 |
| 10,994,548 | B2 | 5/2021 | Linuma et al. | B41J 2/175 |
| 11,027,553 | B2 | 6/2021 | Hsieh | B41J 2/17506 |
| 2002/0113853 | A1 | 8/2002 | Hattori et al. | 347/86 |
| 2003/0043241 | A1 | 3/2003 | Hattori et al. | 347/86 |
| 2009/0278900 | A1 | 11/2009 | Kondo et al. | 347/85 |
| 2012/0125481 | A1 | 5/2012 | Matsumoto et al. | 141/18 |
| 2013/0050310 | A1 | 2/2013 | Seki et al. | 347/6 |
| 2016/0016408 | A1 | 1/2016 | Matsumoto et al. | B41J 2/175 |
| 2016/0200110 | A1 * | 7/2016 | Matsushita | B65D 51/20 347/85 |
| 2017/0197426 | A1 | 7/2017 | Nagai et al. | B41J 2/1404 |
| 2017/0355191 | A1 | 12/2017 | Mizutani et al. | B41J 2/1754 |
| 2017/0355194 | A1 | 12/2017 | Fukasawa et al. | B41J 2/1754 |
| 2017/0355197 | A1 | 12/2017 | Kudo et al. | B41J 2/17513 |
| 2018/0250943 | A1 | 9/2018 | Fukasawa et al. | B41J 2/175 |
| 2018/0272722 | A1 * | 9/2018 | Murphy | B41J 2/17506 |
| 2019/0030903 | A1 | 1/2019 | Fukasawa et al. | B41J 29/02 |
| 2019/0299624 | A1 | 10/2019 | Mizutani et al. | B41J 2/175 |
| 2020/0070523 | A1 | 3/2020 | Fukasawa et al. | B41J 2/175 |
| 2020/0282729 | A1 | 9/2020 | Inoue et al. | B41J 2/175 |
| 2020/0316973 | A1 | 10/2020 | Toki et al. | B41J 2/17523 |
| 2021/0316554 | A1 | 10/2021 | Fukushima et al. | B41J 2/175 |
| 2021/0370680 | A1 | 12/2021 | Miyashita et al. | B41J 2/175 |
| 2022/0009244 | A1 | 1/2022 | Matsumura et al. | B41J 2/175 |
| 2022/0016893 | A1 | 1/2022 | Nagai et al. | B41J 2/175 |
| 2022/0016894 | A1 | 1/2022 | Nagaoka et al. | B41J 2/175 |
| 2022/0032633 | A1 | 2/2022 | Shimada et al. | B41J 2/175 |

FOREIGN PATENT DOCUMENTS

| | | | |
|---|---|---|---|
| CN | 107487086 | | 12/2017 |
| CN | 107487087 | | 12/2017 |
| CN | 207140560 | U | 3/2018 |
| CN | 108528045 | | 9/2018 |
| CN | 207955030 | U | 10/2018 |
| CN | 109318598 | | 2/2019 |
| JP | S64-029165 | U | 2/1989 |
| JP | 2010-052764 | | 3/2010 |
| JP | 4750548 | B2 | 8/2011 |
| JP | 2018-034877 | | 3/2018 |
| JP | 2018-070162 | | 5/2018 |
| JP | 2018-095277 | | 6/2018 |
| JP | 2018-144240 | | 9/2018 |
| JP | 2018-149785 | | 9/2018 |
| JP | 2019-038170 | | 3/2019 |
| JP | 2020-033090 | | 3/2020 |
| TW | 1684535 | B | 2/2020 |
| WO | 2017/213213 | | 12/2017 |

OTHER PUBLICATIONS

Office Action dated Dec. 21, 2022 in counterpart Chinese Application No. 202110787352.6, together with English translation thereof.
Office Action dated Feb. 13, 2024 in counterpart Japanese Application No. 2020-122250, together with English translation thereof.

* cited by examiner

LIQUID STORAGE CONTAINER

This application is a continuation of application Ser. No. 17/370,942 filed Jul. 8, 2021, currently pending; and claims priority under 35 U.S.C. § 119 to Japan Application JP 2020-122250 filed in Japan Jul. 16, 2020; and the contents of all of which are incorporated herein by reference as if set forth in full.

BACKGROUND OF THE DISCLOSURE

Field of the Disclosure

The present disclosure relates to a liquid container configured to store liquid.

Description of the Related Art

Among liquid tanks used in liquid ejecting apparatuses such as inkjet printing apparatuses, there is a liquid tank that can be replenished with liquid. For example, by using a liquid storage container including a discharge port for pouring the liquid, the liquid tank can be replenished with the liquid from the liquid storage container through the discharge port. In this type of liquid storage container, in order to prevent smearing of the surroundings and the hand of a user, a valve with a slit is provided at a front end of the discharge port, and leakage of the liquid is thereby forcedly stopped (see Japanese Patent Laid-Open No. 2018-95277 (hereinafter, referred to as Document 1)).

Document 1 describes a container which includes a discharge port main body and a cover capable of opening and closing the discharge port by covering it and in which a valve with a slit is provided inside the discharge port main body. Document 1 describes a configuration in which the discharge port is sealed with the cover before the cover is completely closed, and then, completely closing the cover causes a protrusion formed in the cover to be inserted into the valve and open the slit portion of the valve.

In the configuration described in Document 1, in the case where the liquid storage container is in storage, the protrusion is inserted in the slit of the valve, and the valve is in an open state. Thus, the liquid storage container is sealed only at the portion between the cover and the discharge port main body. In the case where the size of the discharge port main body is large in this configuration, there is a possibility that the impact resistance decreases, and that the liquid leaks from the sealing portion due to impact of dropping or the like.

SUMMARY OF THE DISCLOSURE

A liquid storage container according to one aspect of the present disclosure includes: a discharge port member including a discharge port through which liquid stored in a storage portion is discharged; a cover portion configured to be attachable to the discharge port member and to be capable of opening and closing the discharge port; and a sealing portion formed of a contact portion between the cover portion and the discharge port member. The cover portion includes a groove structure between an outer periphery of the cover portion and the sealing portion.

Further features of the present disclosure will become apparent from the following description of exemplary embodiments with reference to the attached drawings.

DESCRIPTION OF THE EMBODIMENTS

Figure 1:
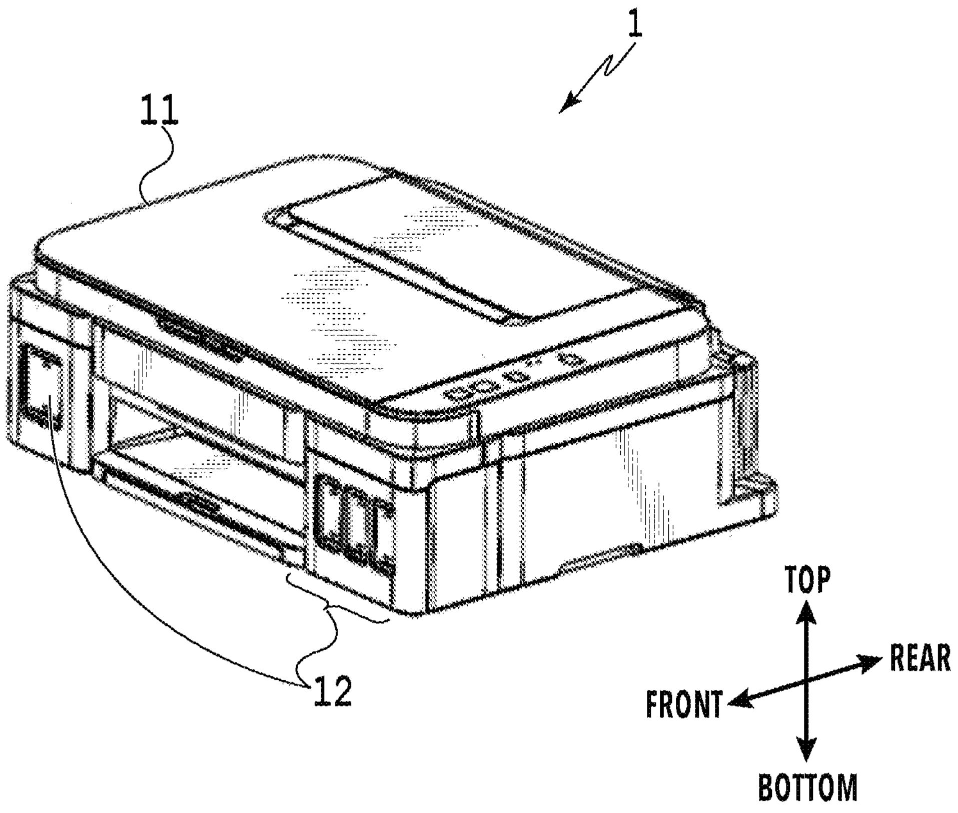
FIG. 1 is a perspective view of an outer appearance of a liquid ejecting apparatus.

Embodiments are described below with reference to the drawings. Note that the same configurations in the description are denoted by the same reference numerals. Moreover, the arrangement of constituent elements relative to one another, the shapes of the constituent elements, and the like that are described in the embodiments are merely examples.

First Embodiment

FIG. 1 is a perspective view of an outer appearance of a liquid ejecting apparatus 1 in the embodiment. The liquid ejecting apparatus 1 illustrated in FIG. 1 is a serial inkjet printing apparatus. The liquid ejecting apparatus 1 illustrated in FIG. 1 includes a case 11 and liquid tanks 12 arranged inside the case 11. Each liquid tank 12 stores an ink that is liquid to be ejected to a print medium (not illustrated).

Figure 2:
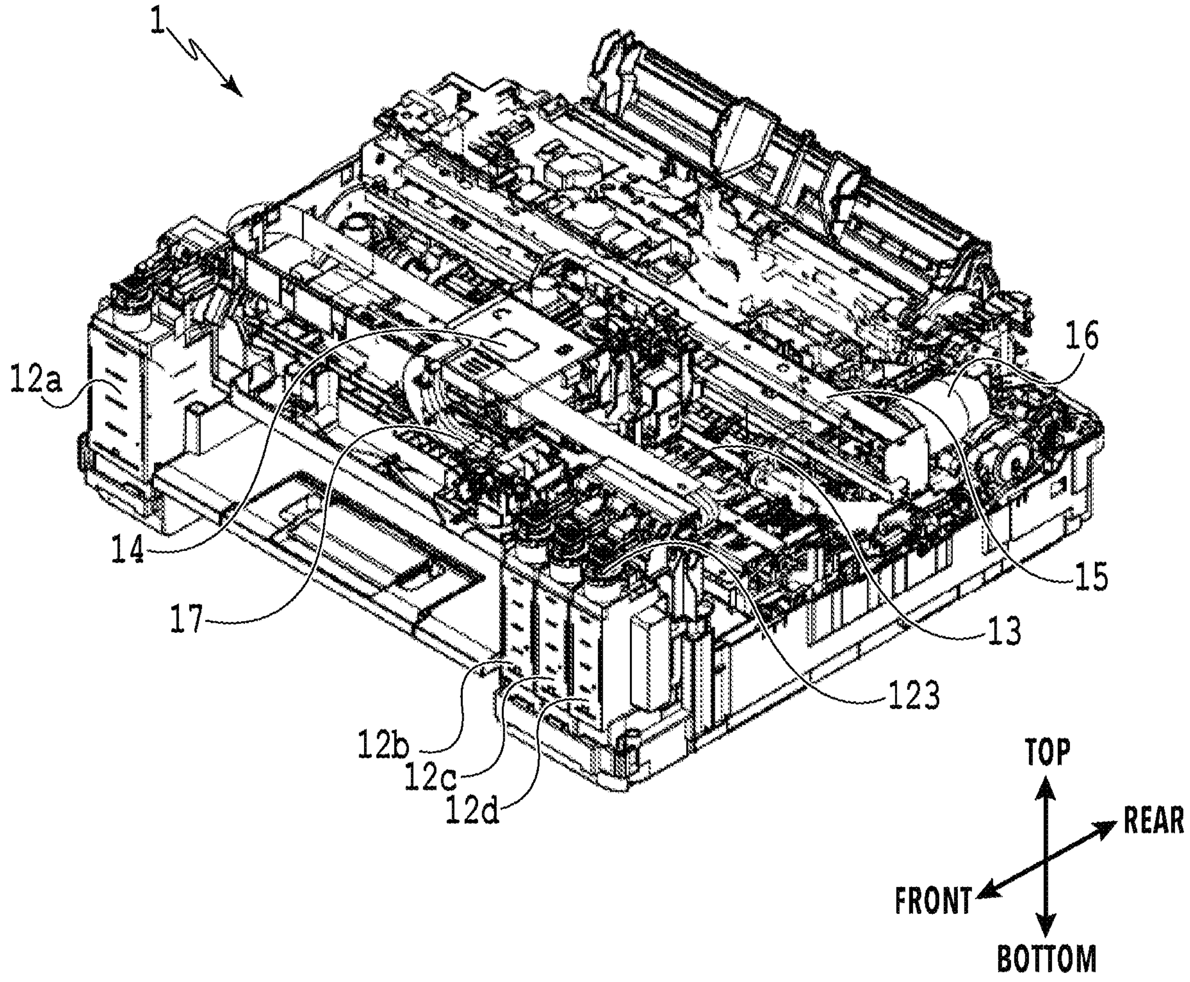
FIG. 2 is a perspective view of an internal configuration of the liquid ejecting apparatus.

FIG. 2 is a perspective view of an internal configuration of the liquid ejecting apparatus 1 illustrated in FIG. 1. In FIG. 2, the liquid ejecting apparatus 1 includes a conveyance roller 13 used to convey the print medium (not illustrated), a carriage 15 provided with a print head 14 configured to eject the liquid, and a carriage motor 16 used to drive the carriage 15. The print medium is not limited to a particular medium as long as an image can be formed on the medium with the liquid ejected from the print head 14. For example, paper, cloth, the label surfaces of optical discs, plastic sheets, OHP sheets or the like can be given as print media.

The liquid is stored in the liquid tanks 12 and is supplied to the print head 14 via a liquid distribution passage 17 to be ejected from the print head 14. In the embodiment, inks of four colors (for example, cyan, magenta, yellow, and black) are used as the liquid, and four liquid tanks 12*a* to 12*d* for the respective colors that store the inks of the respective colors are provided as the liquid tanks 12. In the following description, in the case where the individual liquid tanks, distinguished from one another, are referred, alphabets are added at the ends, for example, liquid tanks 12*a* to 12*d*. In the case where any one of the liquid tanks is referred to, the liquid tank is referred to as the liquid tank 12. The liquid tanks 12*a* to 12*d* for the respective colors are arranged in a front face portion of the liquid ejecting apparatus 1 inside the case 11.

Figure 3A:
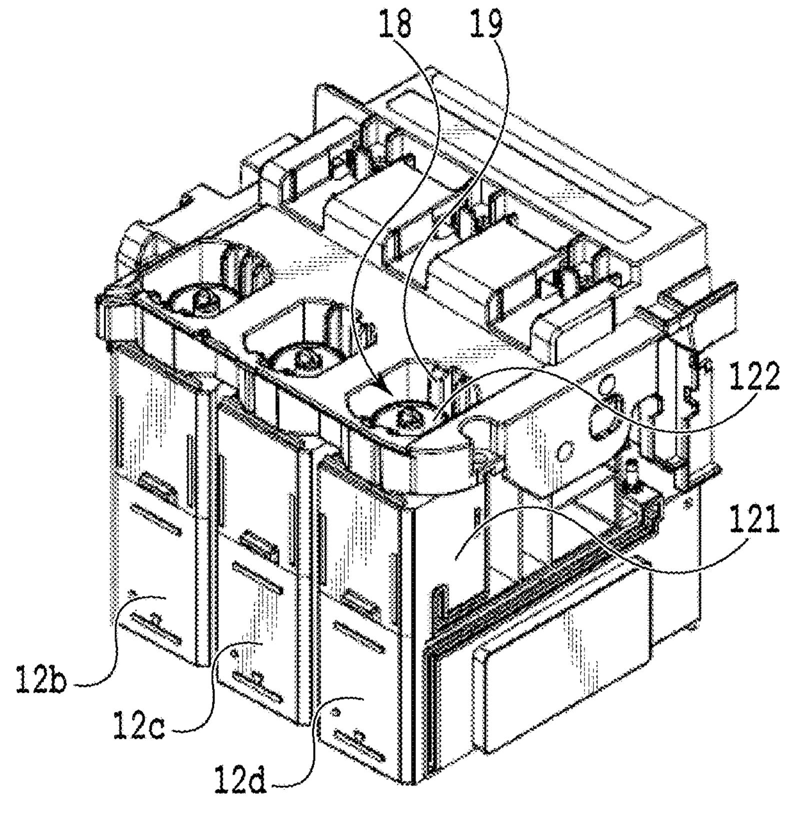
FIGS. 3A and 3B are an enlarged perspective view and plan view of a portion of the liquid ejecting apparatus in which liquid tanks are housed.
Figure 3B:
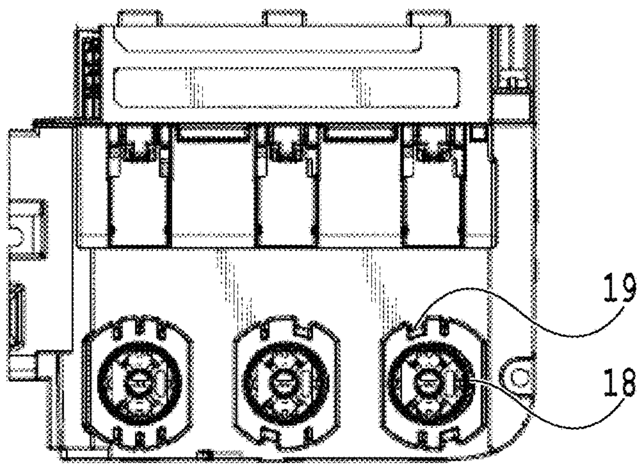

FIG. 3A is an example of an enlarged perspective view of a portion of the liquid ejecting apparatus 1 illustrated in FIG. 1 in which the liquid tanks 12*b* to 12*d* are housed, and FIG. 3B is a plan view corresponding to the perspective view illustrated in FIG. 3A. Each liquid tank 12 includes a liquid tank main body 121 used to store the liquid and a communication flow passage 122 communicating with a liquid storage chamber in the liquid tank main body 121. The liquid tank 12 includes a tank cover 123 (see FIG. 2) configured to be attachable to cover the communication flow passage 122 and seal the storage chamber in the liquid tank main body 121 in occasions other than an occasion of liquid replenishment. In the case where the liquid tank 12 is replenished with the liquid, a discharge port of a liquid storage container 2 (see FIG. 4) is inserted into the communication flow passage 122 and the liquid is poured into the liquid tank 12. The liquid storage chamber is sealed with the tank cover 123 in occasions other than the occasion of liquid replenishment, and thus it is possible to reduce evaporation of the liquid in the liquid tank 12. The communication flow passage 122 includes two flow passages extending parallel to each other in the vertical direction in an interior thereof and is configured to allow the liquid in the liquid storage container 2 to be poured into the liquid tank by means of gas-liquid exchange. A socket 18 is provided in a portion of the liquid ejecting apparatus 1 where the discharge port of the liquid storage container 2 is to be inserted. The socket 18 is provided with protruding portions 19 protruding inward from an inner peripheral wall of the socket 18. The socket 18 is provided for each liquid tank 12, and the shapes of the protruding portions 19 vary among the sockets 18 to suppress erroneous insertion of the liquid container. The protruding portions 19 are rotationally symmetric by 180° with respect to the center axis of the communication flow passage 122.

Figure 4:
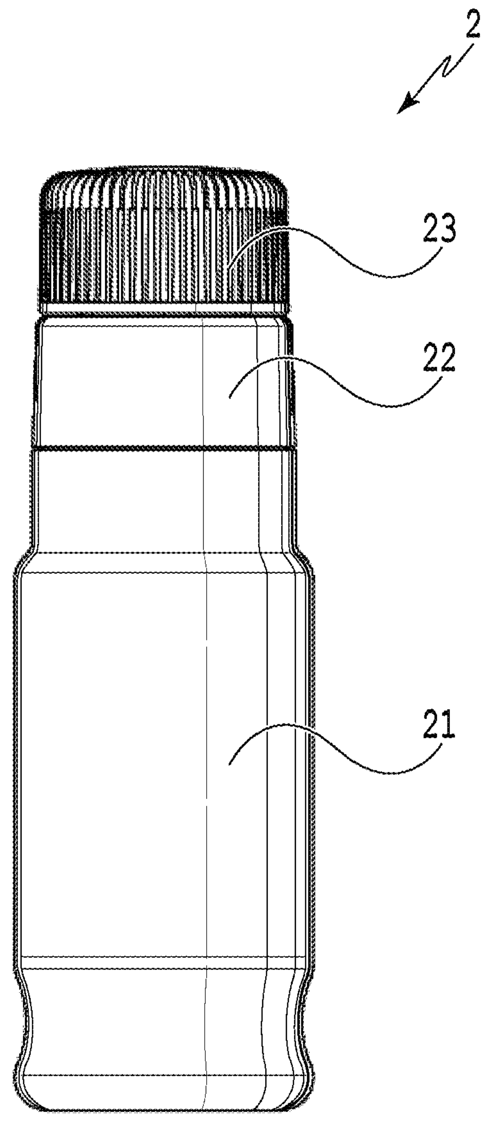
FIG. 4 is an outer appearance view of a liquid storage container.

FIG. 4 is an elevation view of an outer appearance of the liquid storage container 2 which is a liquid container used to replenish the liquid tank 12 with the liquid. The liquid storage container 2 in FIG. 4 includes a bottle 21 that is a storage portion (main body portion) configured to store the liquid, a nozzle 22 coupled to the bottle 21, and a cap 23 attachable to and detachable from the nozzle 22. The nozzle 22 is a discharge port member having a function of an outlet for the case where the liquid stored in the bottle 21 is discharged. The cap 23 is a cover portion that is attached to the nozzle 22 to shield the interior of the liquid storage container 2 (specifically, the bottle 21) from the outside air. Methods of coupling the bottle 21 and the nozzle 22 to each other include a method of sealing a space between the bottle 21 and the nozzle 22 by inserting a flexible part, a method of forming both of the bottle 21 and the nozzle 22 with resin parts and welding the two parts together, and the like. The bottle 21 and the nozzle 22 may be an integral part.

Figure 5A:
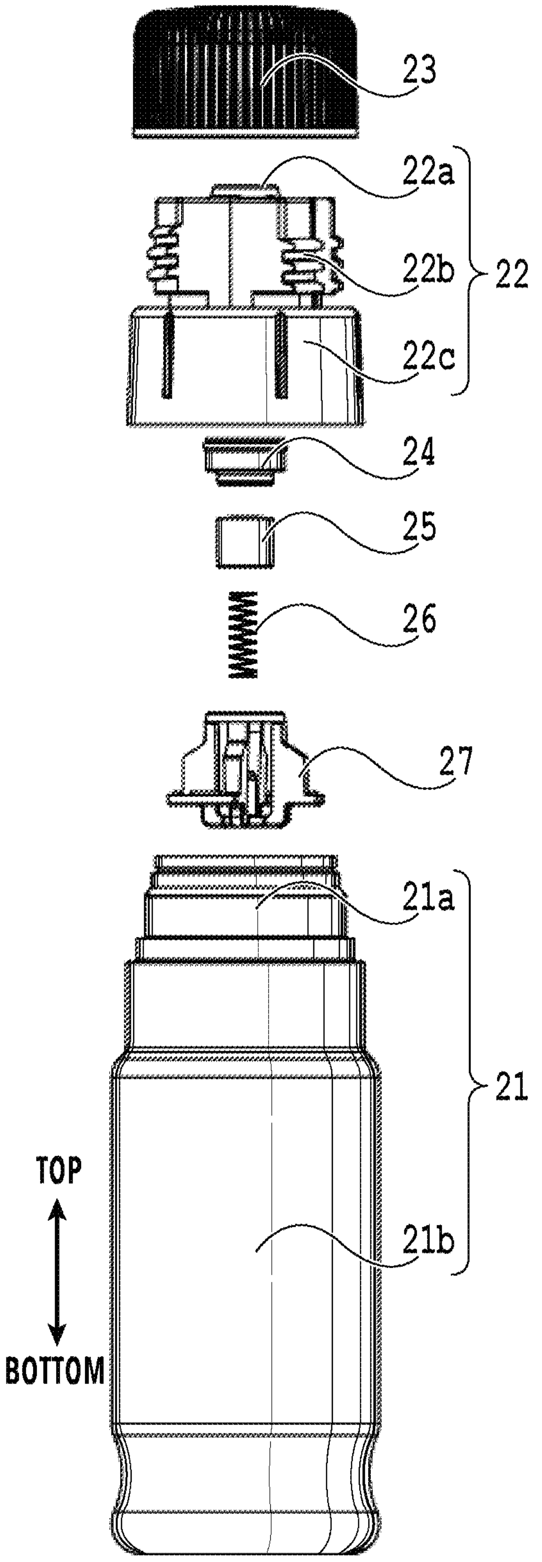
FIGS. 5A and 5B are a part configuration view and cross-sectional view of the liquid storage container.
Figure 5B:
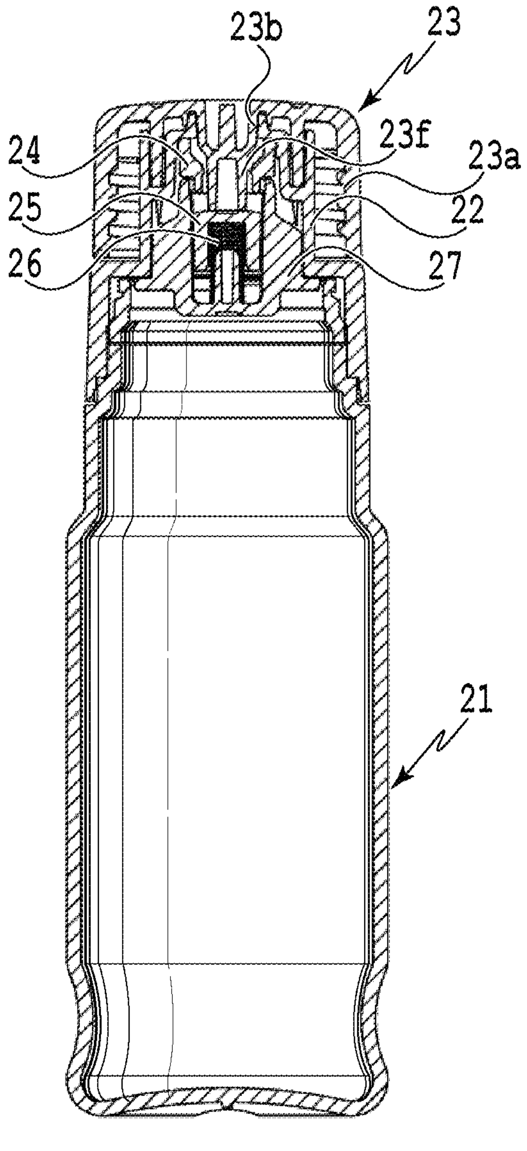

FIG. 5A illustrates an example of a part configuration view of the liquid storage container 2 illustrated in FIG. 4. FIG. 5B is a cross-sectional view in which the parts in the part configuration view of the liquid storage container 2 illustrated in FIG. 5A are coupled to one another. The bottle 21 of the liquid storage container 2 includes a bottle welding portion 21*a* formed in an upper portion and a liquid storage portion 21*b* formed in a lower portion. The nozzle 22 includes a discharge port 22*a* through which the liquid is discharged, a nozzle thread portion 22*b* in which a male thread structure is formed on the outside, and a nozzle welding portion 22*c* in which a welding surface is formed on the inside or a bottom surface. The cap 23, which is the cover portion, is configured to be attachable to and detachable from the nozzle 22, which is the discharge port member, and can open and close the discharge port 22*a*. Polyethylene (PE), polypropylene (PP), and the like can be given as examples of the material forming the bottle 21. Polyethylene (PE), polypropylene (PP), and the like can be given as the material forming the nozzle 22. The nozzle 22 is joined to the bottle 21 by welding the nozzle welding portion 22*c* to the bottle welding portion 21*a*. In the case where the bottle 21 and the nozzle 22 are joined by being welded to each other, the bottle 21 and the nozzle 22 are preferably made of the same type of material. A seal 24 having an opening, a valve 25 configured to open and close the opening of the seal 24, a spring 26 configured to bias the valve 25, and a holder 27 configured to fix the spring 26 are included inside the nozzle 22.

In the case where the liquid is supplied from the liquid storage container 2 to the liquid tank 12, the communication flow passage 122 of the liquid tank 12 is inserted into an opening of the nozzle 22 of the liquid storage container 2. The nozzle 22 of the liquid storage container 2 is provided with recess portions configured to engage with the protruding portions 19 of the socket 18 in the liquid ejecting apparatus 1, and the liquid storage container 2 is aligned in the case where the communication flow passage 122 is inserted into the opening of the nozzle 22. Then, the liquid in the liquid storage container 2 is supplied to the storage chamber of the liquid tank main body 121 via the communication flow passage 122 by means of hydraulic head difference.

The seal 24 which is an orifice portion having an opening into which the communication flow passage 122 is to be inserted is arranged in a front end (upper end) of the nozzle 22. Then, the valve 25, which is a valve element of the liquid stop valve, is biased toward the opening with the spring 26, thereby the gap between the seal 24 and the valve 25 is closed, and the liquid storage container 2 is sealed. In the embodiment, the spring 26 is used as a biasing mechanism, and the holder 27 fixed in an inner space of the nozzle 22 holds the spring 26. The seal 24 is formed of a flexible member made of rubber, elastomer, or the like. Polyethylene (PE), polypropylene (PP), and the like can be given as the material forming the valve 25. Stainless steel (SUS) and the like can be given as the material forming the spring 26. Polyethylene (PE), polypropylene (PP), and the like can be given as the material forming the holder 27. Welding and the like can be given as a method of fixing the holder 27 to the nozzle 22.

In the case where the liquid is supplied from the liquid storage container 2 to the liquid tank 12, the communication flow passage 122 is inserted into the nozzle 22 through the opening of the seal 24, thereby opening the valve 25. Then, as described above, the liquid in the liquid storage container 2 is supplied to the storage chamber of the liquid tank main body 121 via the communication flow passage 122 by means of hydraulic head difference. Note that, as illustrated in FIG. 5B, a protrusion 23*f* or the like may be provided in the cap 23 to open the valve 25 in cap-opening and cap-closing. In the case where the pressure in the liquid storage container 2 is higher than the outside air pressure, this configuration can suppress rushing of the liquid into the liquid tank 12 and overflowing of the liquid from the liquid tank 12 in supplying of the liquid to the liquid tank 12.

In the embodiment, as an example of a method of attaching the cap 23 to the nozzle 22, there is given a method of screwing the cap 23 to the nozzle 22. Specifically, as illustrated in FIGS. 5A and 5B, there is a method of screwing the cap 23 to the nozzle 22 by using the nozzle thread portion 22*b* in which a male thread structure is formed on the outside of the nozzle 22 and a cap thread portion 23*a* in which a female thread structure is formed on the inside of a lower portion of the cap 23. Attaching the cap 23 to the nozzle 22 causes a cap sealing portion 23*b* and part of the discharge port 22*a* to be fitted to each other and allows the liquid storage container 2 to be sealed. Conversely, there may be used a cap 23 in which a male thread portion is formed and a nozzle 22 in which a female thread portion is formed. In a state where the cap 23 is completely attached to the nozzle 22, and the liquid storage container 2 is sealed, the liquid storage container 2 may be maintained in a state where the valve 25 is opened by the protrusion 23*f* or the like.

Moreover, as the method of attaching the cap 23 to the nozzle 22, instead of screwing, a fitting portion other than the sealing portion may be provided. For example, there may be employed a configuration such as an externally-fitted cover in which a cap 23 is fitted to the outside of a nozzle 22 or an internally-fitted cover in which a cap 23 is fitted to the inside of a nozzle 22.

The nozzle 22 of the liquid storage container 2 in the embodiment is provided with the recess portions configured to engage with the protruding portions 19 of the socket 18 in the liquid ejecting apparatus 1. This configuration can prevent, in the case where a liquid tank 12 is replenished with liquid from a liquid storage container 2, erroneous pouring into a wrong liquid tank 12. Meanwhile, providing the recess portions in the nozzle 22 as described above and other factors increase the size of the nozzle 22 in some cases. In the case where the size of the nozzle 22 is increased, there is a possibility that impact resistance decreases and the liquid leaks from the sealed portion due to impact of dropping or the like. Accordingly, in the embodiment, a configuration that mitigates the impact is provided in the cap 23. Description thereof is given below.

Figure 6A:
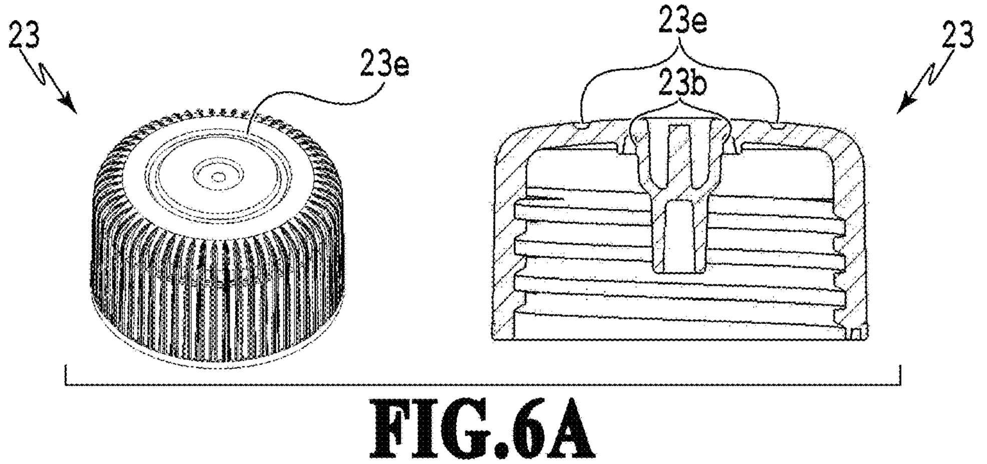
FIGS. 6A to 6E are views of the structures of caps.

FIGS. 6A to 6E are views of the structures of caps 23 in the embodiment. FIG. 6A illustrates a cross-sectional view of the cap 23 and a perspective view of the cap 23 from above. In the embodiment, as illustrated in FIG. 6A, a circular groove structure 23*e* is arranged on the top face of the outside of the cap 23. The outside of the cap 23 refers to the side configured to be in contact with the outside air in the case where the cap 23 is attached to the nozzle 22. The groove structure 23*e* is continuously formed all around the center of the cap 23. Arranging the groove structure 23*e* between the outer periphery of the cap 23 and the sealing portion (cap sealing portion 23*b*) at which the cap 23 and the nozzle 22 are fitted to each other allows the groove structure 23*e* to mitigate an impact acting to a portion near the cap outer periphery due to dropping or the like. Accordingly, it is possible to reduce the impact propagating to the sealing portion and suppress leakage of the liquid. FIG. 7 is a cross-sectional view of the cap 23 in a state where the cap 23 is attached to the nozzle 22. As illustrated in FIG. 7, in the case where the fitting surface of the sealing portion (cap sealing portion 23*b*) extends in the vertical direction in the state where the liquid storage container 2 is standing upright, the groove structure 23*e* functions effectively against an impact in a direction perpendicular to the fitting surface.

Figure 6B:
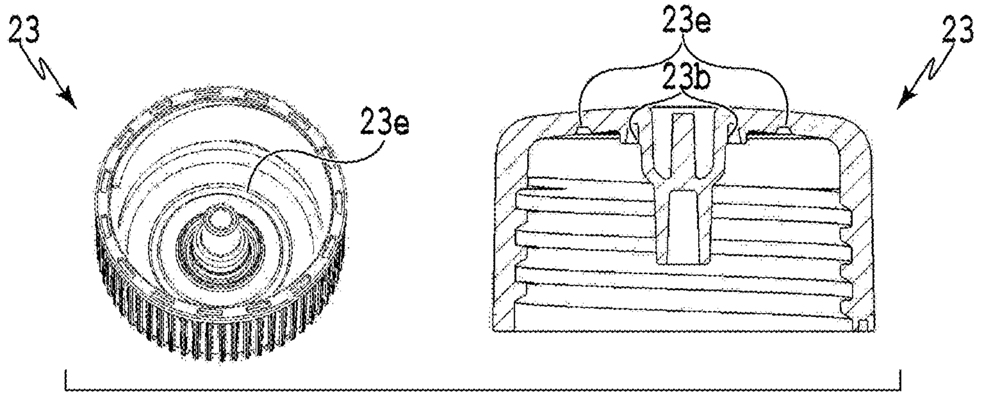
Figure 6D:
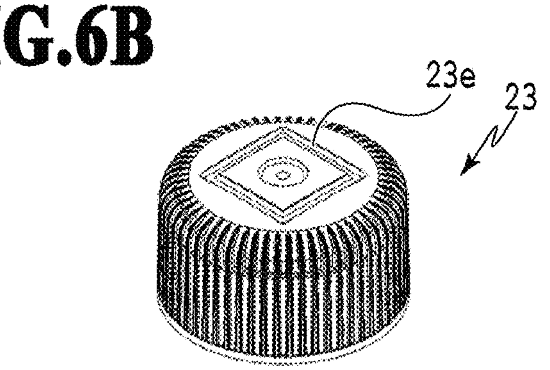
Figure 6C:
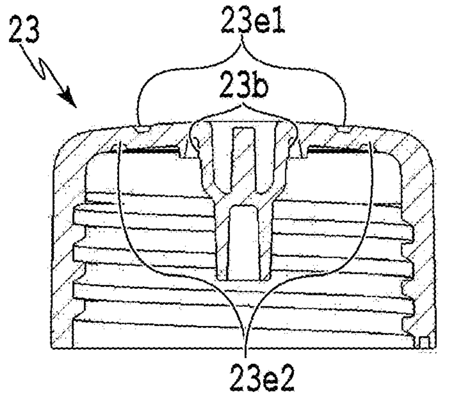
Figure 6E:
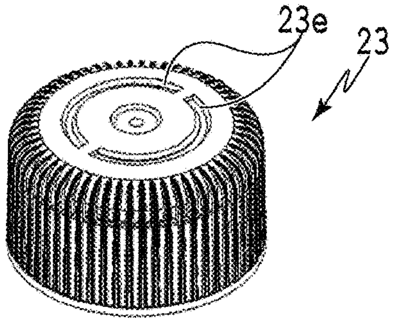
Figure 7:
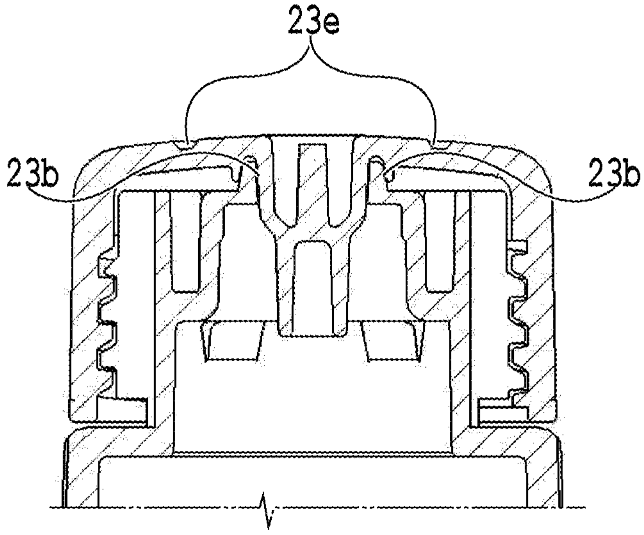
FIG. 7 is a cross-sectional view of a cap in a state where the cap is attached to a nozzle.

FIGS. 6B to 6E are views of other examples of groove structures 23*e*. As illustrated in FIGS. 6B, the groove structure 23*e* may be provided on the top face of the inside of the cap 23. The inside of the cap 23 refers to the side configured to be in contact with the nozzle 22 in the case where the cap 23 is attached to the nozzle 22. Moreover, as illustrated in FIG. 6C, the groove structure 23*e* may be provided on both of the outside (groove structure 23*e*1) and the inside (groove structure 23*e*2) of the cap 23. In all cases, the groove structure 23*e* is provided between the outer periphery of the cap 23 and the sealing portion (cap sealing portion 23*b*) at which the cap 23 and the nozzle 22 are fitted to each other. Note that FIG. 6C illustrates an example in which the groove structure 23*e*2 on the inside of the cap 23 is arranged closer to the outer periphery of the cap 23 than the groove structure 23*e*1 on the outside of the cap 23. However, conversely, the groove structure 23*e*1 on the outside of the cap 23 may be arranged closer to the outer periphery of the cap 23 than the groove structure 23*e*2 on the inside of the cap 23. Moreover, the shape of the groove structure 23*e* may be a polygonal shape as illustrated in FIG. 6D. Furthermore, the groove structure 23*e* does not have to be continuous all around the center as illustrated in FIG. 6E. Specifically, the groove structure 23*e* may be discontinuously formed around the center of the cap 23. Moreover, the width of the groove structure 23*e* may be uniform along the entire groove structure 23*e* or may be partially different. Furthermore, the depth of the groove structure 23*e* may also be uniform along the entire groove structure 23*e* or may be partially different. In the case where the cap 23 is provided with multiple groove structures 23*e*, the groove structures 23*e* may have the same width and the same depth or may have different widths and different depths.

Figure 8:
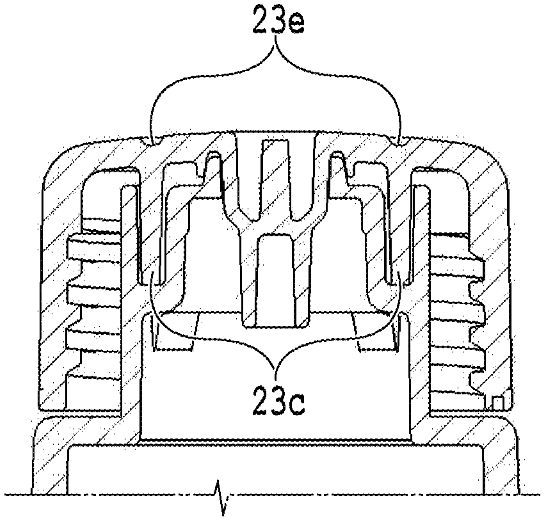
FIG. 8 is a view of another example of a cap.

FIG. 8 is a view of another example of the cap 23. As illustrated in FIG. 8, a cylindrical structure 23*c* configured to be in contact with the nozzle 22 may be arranged directly below the groove structure 23*e*. The cylindrical structure 23*c* thus arranged can make the thickness of the cap 23 uniform, disperse an impact acting to an outer portion of the cap 23, and mitigate the impact propagating to the fitting portion between the nozzle 22 and the cap 23. Moreover, the cylindrical structure 23*c* can suppress scattering of droplets to the outside that may occur in opening of the cap 23.

As described above, in the embodiment, there is used the cap 23 including the groove structure 23*e* between the outer periphery of the cap 23 and the sealing portion between the nozzle 22 and the cap 23. Providing the groove structure 23*e* can mitigate the impact acting to a portion near the outer periphery of the cap 23 using the groove structure 23*e*, reduce the impact propagating to the sealing portion which is the contact portion, and suppress the leakage of the liquid.

Other Embodiments

Although the example in which the liquid storage container is used to replenish the liquid tank of the liquid ejecting apparatus with the liquid is described in the above embodiment, the liquid storage container may be a container used to replenish a liquid tank of any apparatus with liquid. Moreover, although the example in which the ink is used as the liquid stored in the liquid storage container is described, the liquid storage container may store any kind of liquid.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-122250, filed Jul. 16, 2020, which is hereby incorporated by reference wherein in its entirety.

What is claimed is:

1. A liquid storage container for replenishing a liquid ejecting apparatus with liquid comprising:

a storage portion configured to store liquid;

a discharge port unit including a discharge port through which liquid stored in the storage portion is discharged, a flexible member, and a stopping member configured to close a flow passage through which the discharge port communicates with the storage portion, wherein the discharge port, the flexible member, and the stopping member are arranged in this order; and a cover portion configured to be attachable and detachable to the discharge port unit and to be capable of opening and closing the discharge port, wherein, the stopping member has a surrounding portion and a recess portion in a center of the surrounding portion, wherein, both the surrounding portion and the recess portion move to a side of the storage portion after a communication flow passage included in the liquid ejecting apparatus penetrates the flexible member, whereby the discharge port is brought into fluid communication with the storage portion.

2. The liquid storage container according to claim 1, wherein the stopping member seals the liquid storage container.

3. The liquid storage container according to claim 1, wherein the stopping member closes the flow passage through which the discharge port communicates with the storage portion on a vertically upward surface.

4. The liquid storage container according to claim 1, wherein the cover portion and the discharge port unit include thread structures, respectively, and the cover portion is attached to the discharge port unit by the thread structures.

5. The liquid storage container according to claim 1, wherein the cover portion includes a cylindrical protruding portion on a top face of an inner portion of the cover portion.

6. The liquid storage container according to claim 1, wherein the discharge port unit is coupled to the storage portion by sealing a space between the discharge port unit and the storage portion by inserting a flexible part.

7. The liquid storage container according to claim 1, wherein the flexible member is formed of rubber or elastomer.

8. The liquid storage container according to claim 1, wherein the stopping member is formed of PE or PP.

9. The liquid storage container according to claim 1, wherein the liquid stored in a storage portion is ink.

10. The liquid storage container according to claim 1, wherein the communication flow passage includes two flow passages extending parallel to each other in a vertical direction in an interior of the communication flow passage and is configured to allow the liquid in the liquid storage container to be poured into a liquid tank which the liquid ejecting apparatus has by means of gas-liquid exchange.

11. The liquid storage container according to claim 1, wherein the cover portion has a protrusion provided inside the cover portion and facing the discharge port, where the cover portion is attached to the discharge port member.

12. The liquid storage container according to claim 1, wherein the discharge port unit has a nozzle member having the discharge port and coupled with the storage portion, wherein the stopping member is held by the nozzle member before the discharge port is brought into fluid communication with the storage portion.

13. The liquid storage container according to claim 1, wherein the stopping member moves in a direction of penetration of the communication flow passage.

14. The liquid storage container according to claim 1, wherein the cover portion has a plurality of grooves on an outer side surface.

15. A recording unit including a liquid ejecting apparatus and a liquid storage container for replenishing the liquid ejecting apparatus with liquid wherein the liquid storage container comprises:

a storage portion configured to store liquid;

a discharge port unit including a discharge port through which liquid stored in the storage portion is discharged, a flexible member, and a stopping member configured to close a flow passage through which the discharge port communicates with the storage portion, wherein the discharge port, the flexible member, and the stopping member are arranged in this order; and a cover portion configured to be attachable and detachable to the discharge port unit and to be capable of opening and closing the discharge port, wherein, the stopping member has a surrounding portion and a recess portion in a center of the surrounding portion, wherein both the surrounding portion and the recess portion move to a side of the storage portion after a communication flow passage included in the liquid ejecting apparatus penetrates the flexible member, whereby the discharge port is brought into fluid communication with the storage portion; and wherein the communication flow passage includes two flow passages extending parallel to each other in a vertical direction in an interior of the communication flow passage and is configured to allow the liquid in the liquid storage container to be poured into a liquid tank which the liquid ejecting apparatus has by means of gas-liquid exchange.

* * * * *